Nov. 7, 1961     H. V. JONES     3,007,630
CREDIT CARD SYSTEM PUNCHING DEVICE
Filed Oct. 19, 1959     3 Sheets-Sheet 1

INVENTOR.
Harold V. Jones
BY

Nov. 7, 1961   H. V. JONES   3,007,630
CREDIT CARD SYSTEM PUNCHING DEVICE
Filed Oct. 19, 1959   3 Sheets-Sheet 2

*INVENTOR.*

Harold V. Jones

BY

Nov. 7, 1961     H. V. JONES     3,007,630
CREDIT CARD SYSTEM PUNCHING DEVICE

Filed Oct. 19, 1959     3 Sheets-Sheet 3

INVENTOR.

Harold V. Jones

BY *Paul H. Johnson*

3,007,630
Patented Nov. 7, 1961

3,007,630
CREDIT CARD SYSTEM PUNCHING DEVICE
Harold V. Jones, 4030 S. Vandalia, Tulsa, Okla.
Filed Oct. 19, 1959, Ser. No. 847,380
1 Claim. (Cl. 234—45)

This invention relates to a credit card system, and more particularly, but not by way of limitation, to a device for punching sales ticket forms, including means of transferring data existing on a punched credit card to such sales ticket forms.

The use of credit cards has achieved wide acceptance in present business practices. Many companies which market their products to the general public have issued credit cards to thousands of their customers. In some cases these customers may be scattered throughout the United States and even credit card usage on an international basis is gaining in popularity.

Credit cards, as presently used, function primarly as a means of identifying the customer and may, in addition, supply a limited amount of information, such as a customer's serial number, his name, and home address. After a credit card holder makes a purchase, for instance at a gas station, the vendor prepares a sales ticket which is signed by the credit card holder. The information contained on the credit card is either copied by the vendor on the sales ticket, or in some cases credit cards are provided having raised lettering so that stamping means are used to stamp the information contained on the credit card directly on the sales ticket. The vendor forwards the sales ticket to the billing department of the company. In many cases a central billing department may be required to process the sales tickets over a large area, as, for instance, the complete continental United States.

When the sales ticket reaches the billing department certain steps must be taken to prepare it for automatic machine processing. Usually a punched card system is used and a punch machine operator transcribes the information contained on the sales ticket to a punched sales ticket so that the sale may be automatically processed through business machines.

This procedural step, requiring a punch machine operator to transcribe the written information into a coded punch system, is very time consuming and an expensive step in the business transaction. In many cases the sales slips must be sorted by hand, using the visual information contained thereon, before they are delivered to the punch machine operator. These mechanical steps which must be taken to place sales records made from credit cards into forms for machine bookkeeping and billing have materially added to the expense vendors have encountered in credit card business, and have, to a certain extent, curtailed more widespread use of the credit card system.

The present invention contemplates a novel method of preparing punched sales tickets at the point of transaction of the sale, without requiring the intermediate step as is presently used in business practices. Broadly stated, the invention may be defined as a method of preparing a sales slip or sales record by providing means of punching coded information into a punched sales ticket using a credit card to be carried by the purchaser, and a machine for punching information contained on the credit card into a punched sales ticket.

It is an object of this invention to provide a system of transcribing information contained on a credit card means onto a punched sales ticket card wherein the intermediate step of transcribing visual information onto a card for machine bookkeeping and billing is eliminated.

Another object of this invention is to provide a device for transcribing information contained in a punched credit card to be carried by the purchaser onto a punched sales ticket card which will not require an intermediate step involving the transferring of visual information.

Another object of this invention is to provide a device for punching a sales ticket card which will be relatively simple, inexpensive, more or less trouble-free, and which will be physically adaptable to be placed at points of sales in retail businesses.

Another object of this invention is to provide a device which will transcribe onto a punched sales ticket card information as to the vendor, the purchaser, and the amount and kind of sale.

Another object of this invention is to provide a device which will transfer information contained on a credit card to be carried by the purchaser, onto a punched sales ticket card which will be easily and simply operated such as to eliminate mistakes and errors which occur in visually and manually transferring said information.

These and other objects, and a better understanding of this invention may be had by referring to the following description and claims taken in conjunction with the attached drawings, in which:

Figure 1:
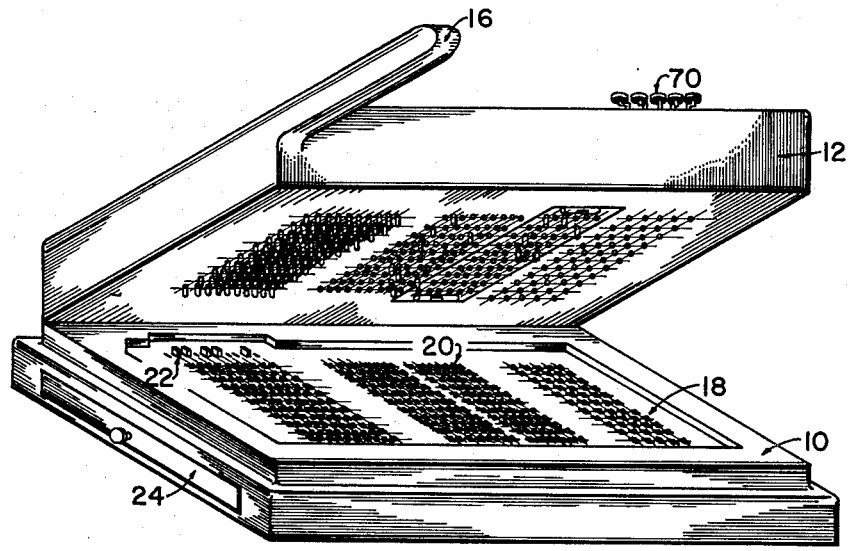
FIGURE 1 is a view of the complete device of the invention wherein the upper portion of the device is partly raised.
Figure 2:
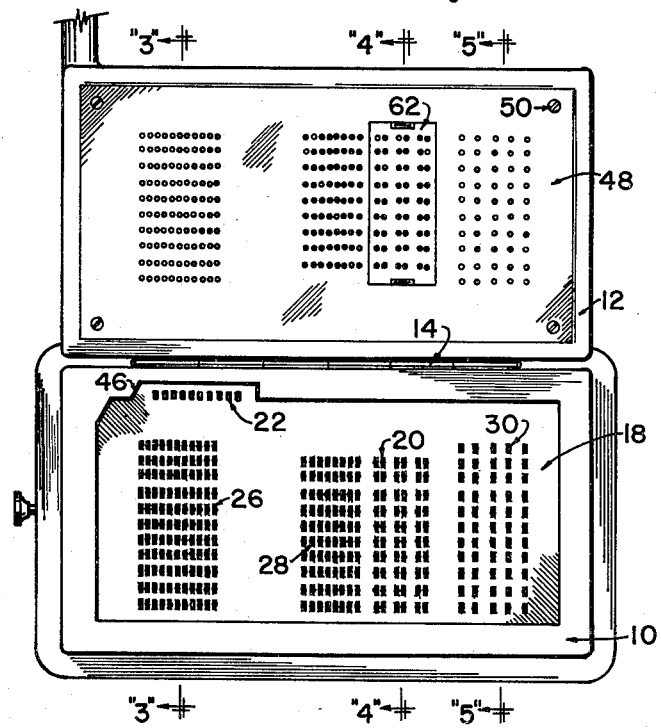
FIGURE 2 is a top view of the device with the upper portion laid completely back to show the configuration of the underside of the upper portion.

Referring to the drawings, and first to FIGURE 1 and FIGURE 2, the numeral 10 indicates the base of the device to which is hinged the upper portion 12, supported by hinges 14. A handle 16 is provided by which the operator can manually close the upper portion 12 against the base 10 to perform the function of the machine.

Base 10 is primarily a support for the elements of the device and forms the foundation for a bottom grid 18. The bottom grid 18 has a multitude of holes 20, corresponding to positions in which holes are punched in commonly used punched business machine cards. Also provided in conjunction with bottom grid 18 is a series of tabs 22, which protrude from grid 18 and are utilized for providing a means of coding the credit card whereby the credit card can be limited to particular vendors. This method of coding the credit card will be explained in more detail later.

A drawer 24 is provided in base 10 to catch the small bits of paper which are punched out during the use of the device.

The upper portion 12 of the device contains the mechanisms used in the punching operation. As can be seen best in FIGURE 2, the punching mechanisms of upper portion 12 are divided into three different types of functions, with each type of function being separated in this disclosure for purposes of explanation. It being understood, however, that in practice the various functions may be closely aligned and can be organized in a multitude of different ways. The various functions are best shown in cross-sectional views taken on line 3—3, line 4—4, and line 5—5, of FIGURE 2.

The information to be transferred by the machine to punched sales ticket cards can be broadly divided into three types. First, the identification of the customer, his home address, his account number, and so forth. This type function is indicated in customer area 26. Store information, such as the number of the store, the store address, the department of the store, the salesman making the sale and such other information as the date of the sale, are transferred to a punched sales ticket card in store area 28. The quantities of the sale, including the amount of the sale and information as to the type of merchandise sold is transferred to a punched sales ticket card by merchandise section 30.

Figure 3:
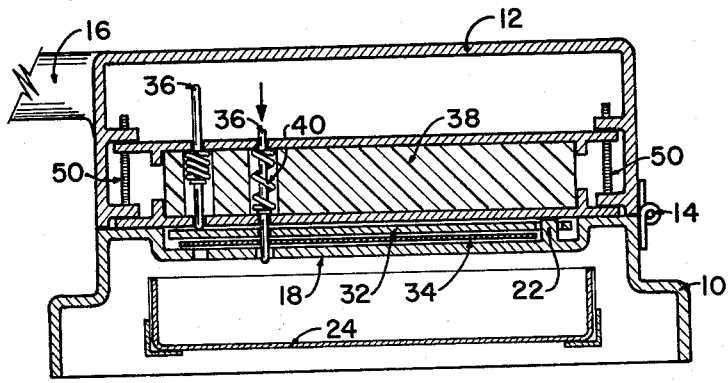
FIGURE 3 is a cross-sectional view taken along the line 3—3 of FIGURE 2, showing the means whereby information is transferred from the credit card to the punched sales ticket card and with the upper portion of the device closed.
Figure 4:
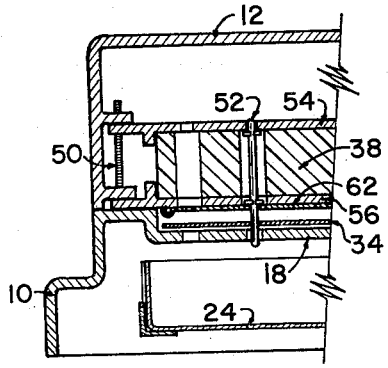
FIGURE 4 is a cross-sectional view taken along the line 4—4 of FIGURE 2, showing a method by which information of the vendor can be transferred to a punched sales ticket card, with the upper portion of the device closed.
Figure 5:
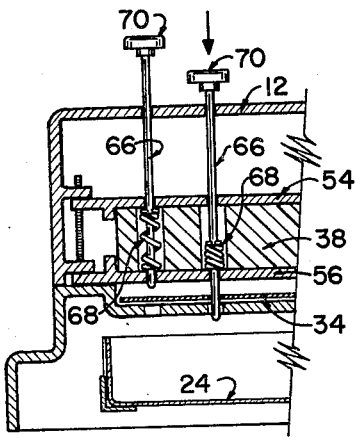
FIGURE 5 is a cross-sectional view taken along the line 5—5 of FIGURE 2, showing a method whereby the quantity and amounts of the sale may be transferred into the punched sales ticket card with the upper portion of the device closed.

Referring to FIG. 3, FIG. 4, and FIG. 5, the methods of the invention for transferring the various types of information to a punched sales ticket card are best shown. Referring first to FIGURE 3, the method of the invention for transferring information from the customer's credit card is indicated. The customer's credit card is indicated by number 32, shown in this view in cross-section and shown in more detail in FIGURE 10. The punched sales ticket card 34 is placed on bottom grid 18 and credit card 32 is placed on top of punched sales ticket card 34 to make contact with it. After placing credit card 32 on top of punched sales ticket card 34, upper portion 12 of the machine is closed. When the upper portion 12 is closed against base 10, information contained in the credit card 32 is automatically transferred to the punched sales ticket card 34. A series of spring-loaded punches 36 are provided, one above each of the multitude of hole positions where holes may appear in the punched business card 34. As indicated in FIGURE 2, the customer area 26 of the bottom grid 18 has a multitude of holes 20 corresponding to the number of available hole positions on credit card 32. In FIGURE 3 only two of the spring-loaded punches 36 are shown, it being understood that in practice there would be a spring loaded punch 36 for each available hole position of credit card 32.

Spring loaded punches 36 are positioned within a punch base member 38, with a spring 40 provided which compresses spring loaded punch 36 so as to protrude beyond upper portion 12 in its normal position. When upper portion 12 is closed against base 10, spring loaded punches 36 first contact credit card 32. Credit card 32 is constructed of a metallic or a tough plastic material. When a hole 20 appears in credit card 32, a spring loaded punch 36 passes through the hole 20 to punch a hole in punched sales ticket card 34 at the position corresponding to the hole in credit card 32. When no hole appears in credit card 32 at a particular position, spring loaded punch 36 encounters the credit card and as the upper portion 12 is closed, the spring loaded punch 36 cannot protrude through credit card 32 and therefore compresses spring 40. Thus, the upper portion 12 is permitted to close, although no hole is punched in this position in the punched sales ticket card 34 conforming to no hole existing in the credit card 32. By this procedure it can be seen that holes 20 will be punched in the punched sales ticket card corresponding to the hole positions in the credit card 32. In this manner all the punched information contained on the credit card 32 is automatically transferred to the punched business card 34. This method of automatically transferring information not only is a great time saver, but eliminates any possibility of mistakes in transcribing manually information which is contained on the credit card 32.

Figures 6, 7, 8, 10:
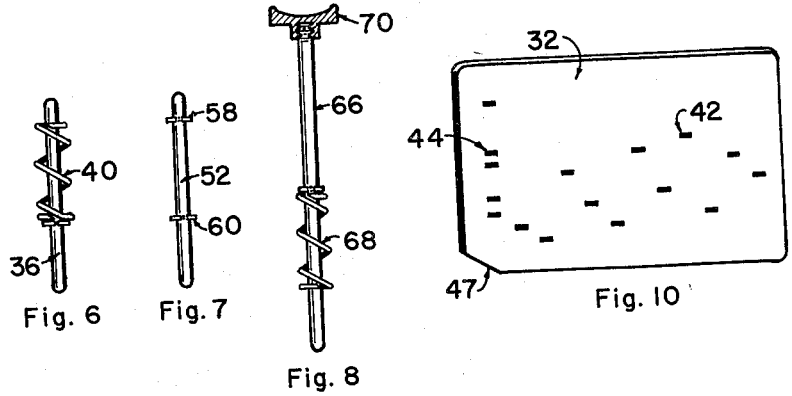
FIGURE 6 is a detailed view of a spring-loaded punch.
FIGURE 7 is a detailed view of a fixed punch.
FIGURE 8 is a detailed view of a manually operated punch.
FIGURE 10 is a view of a credit card as used in the system and device of this invention.

Various methods are available for providing a device of this invention which will receive only selected credit cards 32. Referring to FIGURE 10, it can be seen that credit card 32 contains not only punched holes 42, provided as a source of coded information to be transferred to the punched sales ticket card 34 when upper portion 12 is closed, but also contains an additional row of punched holes 44. These punched holes 44 are disposed to engage tabs 22 protruding from bottom grid 18, as shown in FIGURE 2. When the vendor places the credit card 32 into the machine he must align punched holes 44 in credit card 32 with tabs 22, or the clerk will be automatically notified that the customer holding the credit card 32 is not eligible for credit transactions with the vendor. Another procedure which is available to provide means whereby only selected credit cards can be used in the machine is by providing a card outline 46 in bottom grid 18. As by way of example, credit card 32, shown in FIGURE 10, has an angular corner 47 conforming to card outline 46 of the bottom grid 18. Thus, when credit card 32 is inserted into the device the clerk will know that the customer carrying the credit card 32 is eligible for credit transactions of the store if the outline of credit card 32 conforms to card outline 46 of the device. Various other systems readily suggest themselves, such as providing tabs 22 having odd shapes, such as star shapes, square, rectangular, oval, and so forth, whereby only credit cards 32 having such punched arrangements fit the machine. In this manner vendors can adapt a universal type credit card 32 to indicate that the carrier of the credit card 32 is eligible for credit transactions by punching a hole or holes in the credit card 32 to fit its particular tabs 22 as used in its devices.

Another type of information is transferred by a portion of the device previously designated store area 28 by a process in the device best shown in FIGURE 4. This information, as previously indicated, relates to the store, its location, the department making the sale, the date, and such other information which will be the same for repeated customers at each device position for each day's transaction. Since this information in the store area 28 is not variable from one customer to another, it is not effected by the customer's credit card 32, yet it is information which must be included on the punched sales ticket card 34 to give a complete accounting picture of the transaction. It is anticipated that information in the store area 28 will be varied frequently, with some changes being made at the beginning of each day's business, as for instance, changing the date code to be punched on the punched sales ticket card 34. Information in the store area 28 may be changed by removing upper grid plate 48, after first removing screws 50 (shown in FIG. 2). Fixed punches 52, as shown in detail in FIGURE 7, can then be inserted into the punch base member 38, corresponding to the positions wherein it is desired that holes be punched in the sales ticket card 34. Punch base member 38 is supported between an upper base plate 54 and a lower base plate 56. Upper and lower base plates 54 and 56 are provided with openings for each position corresponding to the multitude of positions in the punched sales ticket card 34. At each position where a hole is desired to be punched in punched sales ticket card 34 a fixed punch 52 is inserted into base member 38 so as to protrude through upper base plate 54. Fixed punch 52 has upper and lower washers 58 and 60 which may be either integrally formed with fixed punch 52, or can be split washers inserted into grooves in the fixed punch 52. Upper washer 58 is disposed to contact upper base plate 54. Fixed punches 52 are supported within punch base member 38. When all fixed punches 52 are inserted to provide the coded information required to be punched in punched sales ticket card 34, lower base plate 56 is placed back into position and screws 50 are tightened to hold it in place. With lower base plate 56 in position fixed punches 52 will protrude through the lower base plate 56 and will act to punch a hole in the punched sales ticket card 34 when upper portion 12 of the device is lowered.

Another method of providing coded information in the store area 28 includes placing a metal tag 62 over an area having a series of spring loaded punches 36, wherein metal tag 62 has predetermined holes permitting part of the spring loaded punches 40 to protrude through holes 64 to punch holes in punched sales ticket card 34 at each time the upper portion 12 of the device is closed. Using the system utilizing metal tag 62 it is intended that such metal tags 62 may be provided for each device at the beginning of each day's operation to provide information in the punched card 34, required by management as indicated by accounting requirements.

Two methods have been indicated for providing punched data in the store area 28 and it is within the purview of this invention that a combination of these two suggested systems for transferring information in the store area 28 may be utilized. One such possible use requiring a combination of the two suggestive methods would be encountered where certain relatively fixed information such as the store number, department, and so forth, are maintained under the system first suggested, utilizing fixed punches 52. Other store information which may change more frequently, but which may be utilized throughout one day's or one part of a day's business transactions, could be changed by changing metal tag 62. For instance, a metal tag 62 may be prepared as a means of coding the data into the machine easily without the necessity of removing lower base plate 56. Also within a business establishment having many sales personnel, each sales person would have a metal tag 62 which he would place in the device during his tour of duty and would remove his metal tag 62 to be replaced by another clerk's metal tag 62 so that sales made by various clerks could be easily recorded onto the punched sales ticket card 34.

The quantity area 30 is used for recording the quantity of sale which is to be charged against the customer or holder of the credit card 32. When a sale has been made the method of recording the transaction would be as follows. Upper portion 12 would be raised and a punched sales ticket card 34 would be inserted into its position in bottom grid 18. At this point punched sales ticket card 34 would have no holes in it. Next, the credit card 32 is placed in its position in the bottom grid 18, contacting a portion of the punched sales ticket card 34. If the configuration of credit card 32 matched the card outlined 46 of bottom grid 18, and if punched holes 44 of the credit card 32 matched tabs 22 in the bottom grid 18, the clerk would know that the holder of the credit card 32 was entitled to credit transactions with the vendor. Upper portion 12 would then be closed and pressed down, as by use of handle 16. Upon closing upper portion 12, spring loaded punch 36 in the customer area, contact credit card 32 and where a hole appears in credit card 32, spring loaded punches 36 protrude through the credit card 32 and punch a corresponding hole in the punched sales ticket card 34. At the same time, fixed punches 52 in the store area 28 punch holes in the punched sales ticket card 34 conveying information concerning the store, as previously discussed. The remaining information which is necessary to give a complete accounting record of the transaction in the form of a punched sales ticket card 34, ready for automatic business machine procedures, is to record the quantity of the sale, that is, the amount of credit which is being extended by the transaction. This is accomplished in the quantity area 30, and is best shown in FIGURE 5. A multiplicity of quantity punches 66 are provided, corresponding to the multitude of positions existing in the quantity area 30 of the punched sales ticket card 34. As indicated in FIGURE 2, a multiplicity of holes 20 are shown in the merchandise area 30 corresponding to the available hole positions in punched sales ticket card 34, however, for simplicity purposes, only two merchandise punches 66 are shown in FIGURE 5.

Merchandise punches 66 are loaded with a spring 68 and are positioned within punch base member 38. Merchandise punches 66 are disposed to protrude through openings in the lower base plate 56 and upper base plate 54 and to also protrude out of upper portion 12 to be readily operable when upper portion 12 of the device is closed against base 10. Merchandise punches 66 are compressed by spring 68 in an upward position so that when upper portion 12 is closed, no holes are punched in the merchandise area 38. Flattened finger keys 70 are affixed to merchandise punches 66 at the upper extremity to facilitate the operator punching proper keys 70, indicating the quantity of the sale. Each key 70 is marked with the appropriate figure designating the quantity signified by the key 70. Thus, after the upper portion 12 is closed, the clerk may easily code directly into the punched sales ticket business card 34, the quantity of the sale, being the amount of credit extended to the holder of credit card 32. Coded information may also be added in the merchandice area 30 by quantity punches 66, designating the type of merchandise sold.

It can be seen that the provisions of this invention provide a punched sales ticket card fully prepared for automatic business machine bookkeeping, billing and accounting at the time and point the sale is made. This will result in a great amount of saving in time normally required in transcribing written information made at the time of sale, into punched coded information for automatic business machine operations.

Figure 9:
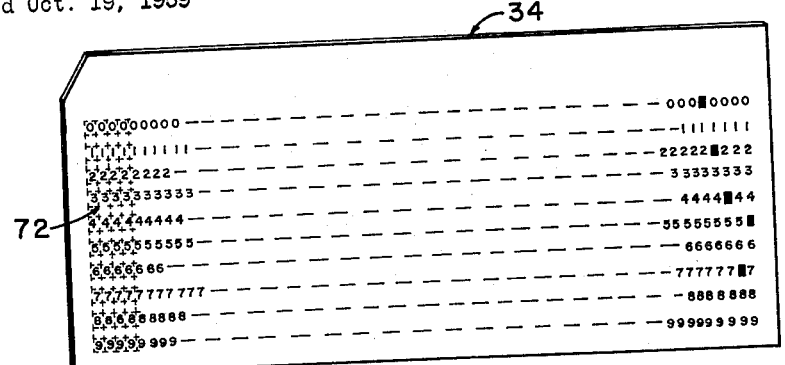
FIGURE 9 is a view of a typical punched sales ticket.

FIGURE 9 is an example of a typical punched business card 34, similar to those presently used in business which would be adaptable without change to the processes and device of the present invention. However, it can be seen that in some respects, alterations in the arrangement of punched business card 34 may facilitate better adaptation to full use of the advantages of the invention. Punched business cards 34 are available which are pre-cut, as indicated by marks 72, whereby holes are easily punched in the cards by the various types of punches 36, 52, and 66 of this invention.

Figure 11:
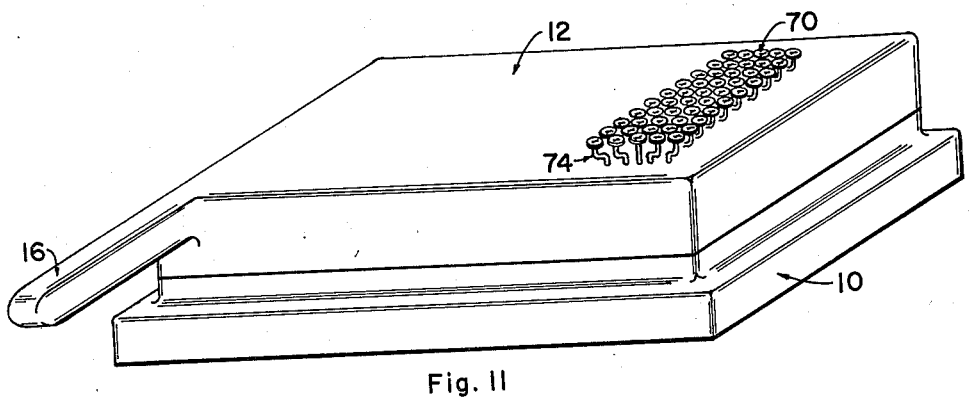
FIGURE 11 is a view of the device with the upper portion completely closed.

FIGURE 11 is a view of the machine fully closed as would occur while the punched business card is being punched and wherein it is ready to receive information in the merchandise area by depressing proper keys 70. It is noted that keys 70 are arranged on merchandise punches 66, whereby keys 70 towards the outside of the group have displaced shafts 74, making possible key 70 of a relatively larger diameter to comfortably fit the fingers of the operator, but permitting holes to be punched in punched sales ticket cards 34 in closer proximity positions.

This invention is described as it particularly pertains to transferring data to a sales ticket card 34 by punching. It can be seen that the principles of the invention are equally adaptable to transferring such data by marking the sales ticket card 34 rather than punching it. This could be achieved by providing a sales ticket card having a layer of carbon paper, so that each of the various types of punches 36, 52 and 66 would press the carbon against the sales ticket card 34 to mark it. The sales ticket card 34 so marked would be ready for use in a business machine designed for marked, rather than punched cards.

Although this invention has been described with a certain degree of particularity, it is manifest that many changes may be made in the details of construction and methods of the disclosure without departing from the scope of the invention.

I claim:

A device for transferring information to a first, second and third area of a sales ticket card wherein part of the information to be transferred is contained in a punched credit card having holes positioned therein according to a prearranged code; comprising, in combination; a grid member disposed to receive said sales ticket card and said punched credit card whereby said punched credit card is contiguous to said first area of said sales ticket card, said grid member having a multiplicity of holes therein; a punch base member pivoted to said grid member, said punch base member having a first, a second and a third area; a multiplicity of spring loaded punches slideably positioned in said first area of said punch base member, said spring loaded punches protruding beyond said punch base member to engage said punched credit card; springs compressibly disposed between said spring loaded punches and said punch base member whereby when said punch base member is pivoted toward said grid member, said credit card engages said spring loaded punches to compress said springs of said spring loaded punches and wherein said spring loaded punches which coincide with said holes in said credit card protrude through said holes in said credit card to punch substantially identical holes in said first area of said sales ticket card; a multiplicity of fixed punches supported to said second area of said punch base member, said fixed punches positioned according to a prearranged code whereby as said punch base member is pivoted to close upon said grid member said fixed punches engage said second area of said sales ticket card to protrude through said sales ticket card and said holes in said grid base to punch holes in said second area of said sales ticket card; a multiplicity of spring loaded key punches slideably supported in said third area of said punch base member; springs compressibly positioned between said key punches and said punch base member to constrain said key punches away from said grid member when said punch base member is pivoted to close upon said grid member; and keys affixed to said key punches whereby said key punches may be manually depressed, compressing said springs, and whereby said key punches protrude through said third area of said sales ticket card and said holes in said grid member to punch holes in said sales ticket card.

References Cited in the file of this patent

UNITED STATES PATENTS

| | | |
|---|---|---|
| 562,852 | Rogers | June 30, 1896 |
| 1,407,056 | Foote | Feb. 21, 1922 |
| 2,664,815 | Schuessler | Jan. 5, 1954 |
| 2,768,691 | Cooper | Oct. 30, 1956 |